(No Model.)
N. C. MITCHELL.
RECOVERING RUBBER FROM RUBBER WASTE.
No. 249,970. Patented Nov. 22, 1881.
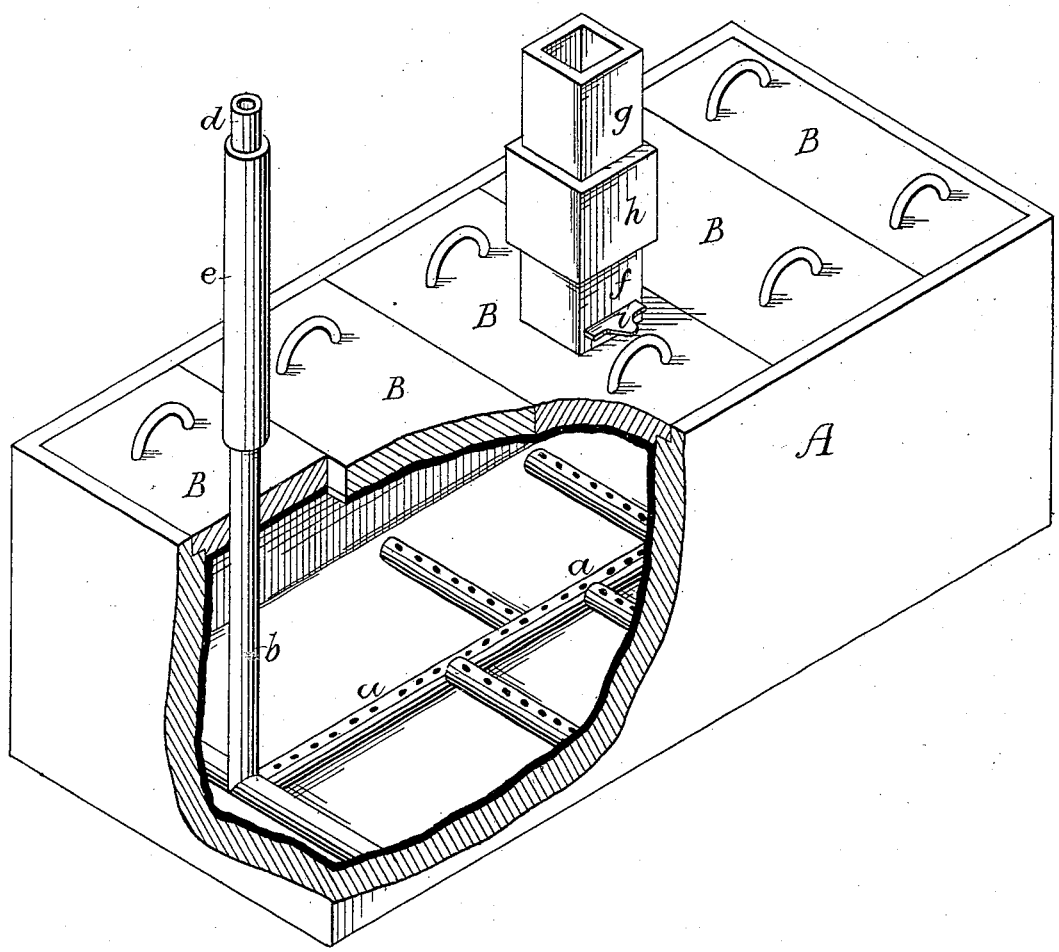
Witnesses
Wm. P. Logan
Harry Smith
Inventor
N. Chapman Mitchell
by his Attorneys
Howson and Sons

UNITED STATES PATENT OFFICE.

N. CHAPMAN MITCHELL, OF PHILADELPHIA, PENNSYLVANIA.

RECOVERING RUBBER FROM RUBBER WASTE.

SPECIFICATION forming part of Letters Patent No. 249,970, dated November 22, 1881.

Application filed May 19, 1881. (No model.)

*To all whom it may concern:*

Be it known that I, N. CHAPMAN MITCHELL, a citizen of the United States, residing in Philadelphia, Pennsylvania, have invented certain Improvements in Recovering Rubber from Rubber Waste, of which the following is a specification.

The object of my invention is to effect the thorough and economical recovering of rubber, whether raw or vulcanized, from rubber waste.

In the manufacture of many articles—such as wearing-apparel, overshoes, belting, hose, packing, &c.—rubber or the compound of which rubber forms a part is usually combined with fibrous or textile material—such as woolen or cotton cloth—the rubber or rubber compound being generally applied to the cloth in the form of a coating, and the rubber being sometimes raw or sun-cured and sometimes vulcanized.

Many attempts have heretofore been made to recover the rubber or rubber compounds from the scraps or cuttings resulting from the manufacture of rubber goods, or from the goods themselves after they have become so worn as to be no longer available for the purposes for which they were intended. Among the plans hitherto proposed may be mentioned the subjecting of the scraps or waste to the action of boiling water or steam, or to heated solutions of caustic alkali or diluted sulphuric acid; but all of these processes have been so far from practical that the waste is generally considered valueless.

I have ascertained that the rubber in the waste will effectually resist the action of strong sulphuric or muriatic acid heated to a high temperature, but that the textile material will yield to the corrosive influence of the acid, the zinc and whiting with which the rubber is usually combined also yielding to the acid, thus leaving the rubber in the condition of a practically pure and marketable article, and in an application for patent filed by me on the 5th day of May, 1881, I have described and claimed this process.

My present invention relates to certain improvements in the process, as will be hereinafter set forth.

The accompanying drawing illustrates apparatus which I have used in carrying out my invention, although the practice of the invention is not limited to the use of this particular apparatus.

A is a tank having detachable covers B, both the tank and covers being lined with lead to resist the action of the acid. In the bottom of the tank is a perforated pipe, *a*, having suitable perforated branches, and provided at one end with a vertical branch, *b*, which passes through an opening in one of the covers B, and is connected to the supply-pipe *d* by means of a section of rubber tubing, *e*, which can be readily detached from the pipe *b* when it is desired to remove the covers in order to gain access to the inside of the tank.

D is a vapor-discharge pipe, one section, *f*, of which is carried by one of the covers B of the tank, and is connected to the fixed section *g* by means of a sliding section, *h*, which can be elevated when it is desired to disconnect the section *f* from the section *g* of the pipe. A leaden plate, *i*, serves as a valve or damper to control the flow of vapor through the pipe D.

In carrying out the invention the acid is deposited in the bottom of the tank A, and the waste is then introduced into the tank, after which the covers B are applied, and steam, under a pressure of from fifty (50) to seventy-five (75) pounds, is permitted to pass through the pipe *a* and its branches, the steam escaping from the perforations and imparting a high degree of heat to the acid. The treatment is continued for from one to five hours, in accordance with the character of the material, and the thick pasty mass which results from the treatment is then removed from the tank and subjected to the action of a washing-machine, the effect of which is to separate and carry off the sulphuric acid and impurities, leaving the rubber in a pure, or almost pure, condition. The recovered rubber is subsequently dried and passed between rolls or mullers, whereby it is kneaded into a compact homogeneous mass, ready for the market. The strength of the acid and the quantity employed in respect to the quantity of material treated will depend upon the proportion of fiber in the waste. In practice I have used acid of a strength of 66°

Baumé, employing for every thousand pounds of waste from three hundred to five hundred pounds of sulphuric acid, or from four hundred to seven hundred and fifty pounds of muriatic acid. When the rubber is combined with woolen fabric having long fibers of extra strength, I sometimes add to the sulphuric or muriatic acid about one-twentieth part of its weight of fluoric acid, to facilitate the operation. So far as the vegetable fibers are concerned, they are entirely eliminated by the corroding action of either the sulphuric or muriatic acid; but the zinc and whiting with which the rubber is usually combined are differently affected by the two acids, the sulphuric acid forming comparatively insoluble sulphates of zinc and calcium, which must afterward be removed from the mass by washing, whereas the muriatic acid unites with the zinc and whiting to form soluble chlorides of zinc and calcium, which are afterward more easily removed, so that while the use of sulphuric acid is preferable on the score of economy, muriatic acid is preferred when it is desired to recover the rubber in a state as nearly pure as possible.

An essential feature of my present invention is the direct injection of live steam into the mass in the tank, as the steam penetrates every portion of the mass and carries the acid with it. In fact, I have found in practice that when the rubber is combined with woolen fibers the combined action of the steam and acid is the only effective means of destroying the said fibers. When the rubber contains but about one or two per cent. of sulphur the latter will be eliminated by the treatment above set forth; but when a larger percentage of sulphur is present the rubber retains its vulcanized character, the effect of the acid treatment being simply to eliminate the fibrous portions of the waste.

My invention is distinct from the plan which has been proposed of treating the waste with exceedingly diluted acid, as the latter can have no appreciable corroding effect in removing the fiber or impurities with which the rubber may be combined, whereas strong sulphuric or muriatic acid completely eliminates the fibers, and so changes the character of the impurities, as hereinbefore set forth, that they can be readily removed by subsequent washing.

There can be no appreciable dilution of the acid by condensed steam in my apparatus, as the contents of the tank are maintained at a high temperature, and the steam or vapor, as it rises above the mass in the tank, passes at once through the draft-tube D, so that the accumulation of water due to condensation of the steam is very slight.

I do not desire to claim in this application the process of recovering the rubber by boiling the waste in sulphuric or muriatic acid of a strength sufficient to corrode and eliminate the fibrous material and separate the impurities from the rubber, as this is described and claimed in my former application, above alluded to; nor do I desire to claim the subjection of the waste to the action of steam, separately considered; but

I claim as my invention and desire to secure by Letters Patent—

As an improvement in recovering rubber from rubber waste, wherein the rubber waste is boiled in strong sulphuric or muriatic acid, the process of bringing such acid into immediate contact with all portions of the mass, which consists in injecting steam into the strong acid in the tank containing the mass, whereby the steam penetrates every portion of the mass and carries the acid with it, as specified.

In testimony whereof I have signed my name to this specification in the presence of two subscribing witnesses.

N. CHAPMAN MITCHELL.

Witnesses:
WM. P. LOGAN,
HARRY SMITH.